United States Patent [19]
Schell et al.

[11] Patent Number: 5,504,896
[45] Date of Patent: Apr. 2, 1996

[54] METHOD AND APPARATUS FOR CONTROLLING PROGRAM SOURCES IN AN INTERACTIVE TELEVISION SYSTEM USING HIERARCHIES OF FINITE STATE MACHINES

[75] Inventors: William M. Schell, Watchung, N.J.; Guy A. Story, New York, N.Y.

[73] Assignee: AT&T Corp., Murray Hill, N.J.

[21] Appl. No.: 175,059

[22] Filed: Dec. 29, 1993

[51] Int. Cl.⁶ ..................................................... G06F 9/00
[52] U.S. Cl. ........................... 395/650; 364/DIG. 1; 364/284.3; 364/284; 364/281.3; 364/280; 364/141
[58] Field of Search ................................. 395/650, 700; 364/141

[56] References Cited

U.S. PATENT DOCUMENTS

| | | | |
|---|---|---|---|
| 4,290,142 | 9/1981 | Schnee et al. | 455/3 |
| 4,799,141 | 1/1989 | Drusinsky et al. | 364/141 |
| 4,809,257 | 2/1989 | Gantenbein et al. | 370/4 |
| 5,220,420 | 6/1993 | Hoarty et al. | 358/86 |
| 5,355,480 | 10/1994 | Smith et al. | 395/600 |

*Primary Examiner*—Kevin A. Kriess
*Attorney, Agent, or Firm*—Geoffrey D. Green

[57] ABSTRACT

A method of using finite state machines (FSMs) is disclosed for controlling multiple processes in response to input signals. In an exemplary embodiment, such processes comprise facilities for providing interactive television services and multimedia signals for such services. The FSMs are arranged in a tree-like structure and communicate with each other by event messages of various types. Each FSM has multiple states and permitted state transitions. Transitions occur in response to event messages and/or input signals, and a transition can cause one or more event messages associated with such transition to be sent. At least one terminal FSM is associated with each of the multiple processes and controls that process. Status changes in each process can also cause state transitions in the FSMs. The FSMs are resident in the various processors controlling the multiple processes, which can be situated at different locations.

9 Claims, 6 Drawing Sheets

METHOD AND APPARATUS FOR CONTROLLING PROGRAM SOURCES IN AN INTERACTIVE TELEVISION SYSTEM USING HIERARCHIES OF FINITE STATE MACHINES

FIELD OF THE INVENTION

This invention relates to controlling multiple processes and more particularly to controlling systems for furnishing interactive television services and generating multimedia signals from various video and audio sources for transmission to users of such services.

BACKGROUND OF THE INVENTION

Cable television systems have made possible the transmission of many channels of television programs to the homes of subscribers. Instead of being limited to the number of VHF and UHF channels that can be transmitted and received in a given area, the number of channels in cable systems is limited only by the transmission characteristics of the cable itself and the ability to compress the information in television programs into narrower-bandwidth channels. The advent of fiber-optic transmission systems for use in cable television networks has also vastly increased the number of channels available.

A cable headend to subscriber channel does not need the full bandwidth of the usual television cable channel if compression can be used. For example, if a television signal is digitized and compressed in accordance with the MPEG-1 standard, it is possible to transmit sixteen television programs digitally over a single conventional 6 Mhz cable channel. Other program information, such as high-fidelity audio, still video pictures or text can also be sent in compressed form. By using a large number of conventional channels for ITV purposes, such as is now possible with optical fiber distribution systems, together with compression, it is conceivable that hundreds of virtual channels could be made available.

Systems are also becoming available for transmitting compressed and encoded television signals over telephone circuits. In one such system, 1.5 megabits/second of data, sufficient for one compressed and encoded television channel, can be transmitted from a telephone central office over a twisted-pair loop to a subscriber's premises, and 16 kilobits of data can be transmitted back to the central office, together with regular telephone service. Such a loop is known as an asymmetric digital subscriber loop.

Such increase in channels has also given rise to proposals for interactive television systems wherein a subscriber can transmit information or requests back into the system, which information or requests may subsequently affect programs or information directed to such subscriber. There are a wide variety of applications for interactive television systems, such as video games, video catalog shopping, teaching systems, movies on demand and audio programs. Each application can be tailored for an individual subscriber, for example, a subscriber may be able to select the language of the soundtrack in a movie. However, such systems typically require the ability (i) to control specific programs or information sent to each subscriber and (ii) to receive input messages or requests from the subscriber.

With the wide deployment of digital communication systems, standardized digital transmission systems have become available in which data is transmitted in packet form over networks. One such network is an asynchronous transmission mode (ATM) network in which packets of varying length can be sent. Such packet networks can be used for carrying digitized television signals.

Clearly, the means now exist by which tailored television signals can be delivered to individual users, such as by cable television systems, telephone networks, packet networks and satellites. Also, a large number of sources are available from which programs and interactive television applications can be provided. However, problems arise in the efficient control of systems for providing such services to large numbers of simultaneous users.

What is needed for controlling the related processes of an interactive television system is an efficient method of configuring a modular control system for such processes. Such system must be capable of controlling the generation of the various services to be provided to the multiple users of such a system, which can contain multiple processors at different locations.

SUMMARY OF THE INVENTION

A method of using finite state machines (FSMs) is disclosed for controlling multiple processes in response to input signals. In an exemplary embodiment, such processes comprise facilities for providing interactive television services and multimedia signals for such services. The FSMs communicate with each other by event messages of various types. Each FSM has multiple states and permitted state transitions. Transitions occur in response to event messages, input signals and status signals from processes being controlled and a transition can cause one or more event messages associated with such transition to be sent.

The FSMs are arranged in a multi-level communication hierarchy, usually in a tree-like structure including a single director FSM in a top level, multiple director FSMs at intermediate levels and multiple terminal FSMs at the lowest levels. Each FSM in the intermediate and terminal levels can communicate with at least one FSM in the next higher level. The director FSMs can communicate with one or more FSMs that are their direct descendants in the next lower level.

At least one terminal FSM is associated with each of the multiple processes to be controlled. Events in each process can cause state transitions in their associated terminal FSMs and in other FSMs by means of event messages forwarded up the hierarchy by the terminal FSMs. FSMs can be resident in various processors controlling the multiple processes, which processors can be situated at different locations.

Other embodiments are described in which multiple hierarchies of FSMs are linked.

These and other aspects of the invention will become apparent from the drawings and detailed description.

DETAILED DESCRIPTION

The invention is for use in controlling multiple processes. In this context, each process can be any kind of apparatus or system, embodied in hardware or software, that responds to control signals and that may also generate signals indicating its status.

Figure 1:
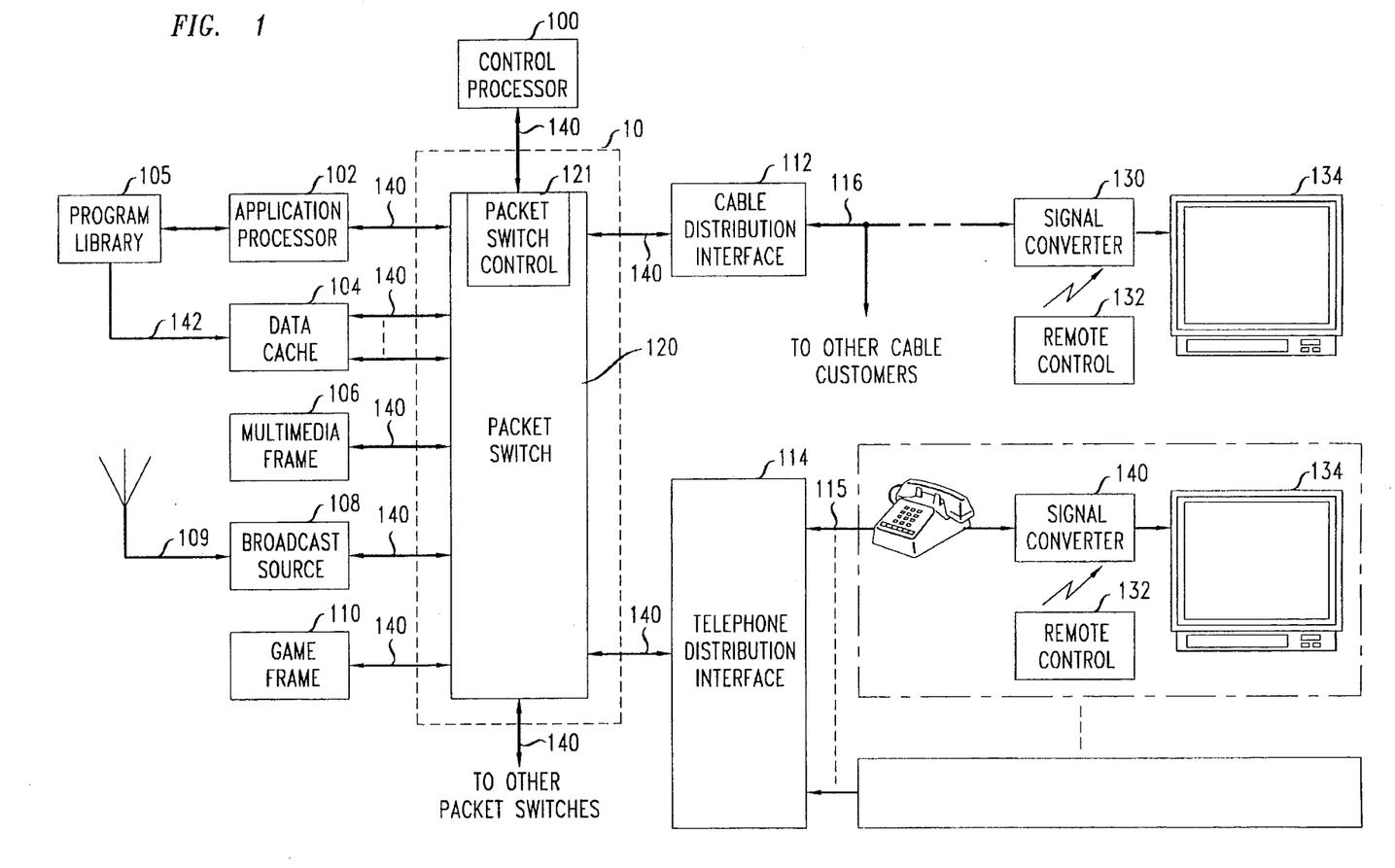
FIG. 1 is an overall block diagram of an integrated television services system that can be controlled by the system of the invention.

FIG. 1 is an overall block diagram of a basic integrated television services (ITV) system, which is an example of the type of multiple process system in which the invention can be used. The elements of the ITV system communicate through packet network 10, which includes one or more packet switches 120. Such elements include control processor 100, application processor 102, application resources such as data cache 104, multimedia frame 106, broadcast source 108 and game frame 110 and one or more distribution interfaces 112 and 114, all of which are connected by links 140 to packet switch 120. Program library 105 is a high-capacity, long-term source of stored program material for data cache 104. Broadcast source 108 furnishes digitized and compressed program material from television broadcasts, cable systems, satellites or other means. In an exemplary embodiment, packet network 10 is an asynchronous transfer mode (ATM) network, links 140 are SONET OC-3 links, and packet switch 120 is an ATM switch such as the AT&T GCNS-2000 ATM switch.

In general, control processor 100 serves to interact with users selecting any of the various interactive services that may be provided by the system of the invention, and application processor 102 controls the services themselves. Control processor 100 also assigns the resources necessary to provide a service to a user. Application processor 102 and application resources such as data cache 104, multimedia frame 106, broadcast source 108 and game frame 110 can be duplicated as necessary to meet the capacity requirements of the system, but control processor 101 is preferably not duplicated because such processor maintains assignment records for the various resources in the system and making such records available to more than one processor, while achievable, is cumbersome.

Data cache 104 is a large random access memory for storing audio and video material in compressed and packetized form, such as the program server described in copending patent application Ser. No. 07/997,985 filed Dec. 29, 1992 and assigned to the same assignee as this invention. Data cache 104 can have one or more links 140 into packet network 10 depending on capacity requirements. Program library 105 can be a large-capacity system of any convenient type for storing program material, such as movies, musical selections, video clips, still frames and audio clips, in digitized and compressed form on devices such as magnetic tapes or optical discs and the like. Link 142 between program library 105 and data cache 104 can also be made via a separate ATM packet network, such as a SONET OC-3 network, or via packet network 10, depending on capacity and geographic limitations. Program library 105 is typically equipped to transmit a large quantity of data, such as digitized and compressed video and audio signals for complete movies, to data cache 104 in a relatively short time, as described in more detail in the above-mentioned application.

It is contemplated that the various elements shown in FIG. 1 will be situated at different geographic locations. For example, packet switch 120, control processor 100, application processor 102, multimedia frame 106, broadcast source 108 and game frame 110 can be at a first location, data cache 104 can be at a second location and program library 105 can be at a third location. Other packet switches 120 and distribution interfaces such as 112 and 114 can be at still other locations. Connections between locations can be SONET OC-3 links. It will be clear to those skilled in the art that numerous possible combinations of and locations for such elements are possible.

Many interactive television services may be offered that incorporate broadcast television programs. Therefore, one of the application resources provided in the system of the invention can be a source of such programs, such as broadcast source 108, which receives one or more broadcast television signals from regular broadcasts, from satellite transmissions, from cable television systems or from any other appropriate means, all symbolized by antenna 109. Broadcast TV source 108 includes facilities for digitizing and compressing each received television signal and transmitting such signals in packetized form via packet network 10.

Multimedia frame 106 contains a number of units for composing compressed and packetized multimedia signals from a number of different sources, such as data cache 104, broadcast source 108 and internal text generators. When a multimedia signal is to be transmitted to a user, control processor 102 assigns one of such composing units and the necessary virtual channels to create the multimedia signal. Note that the input signals to multimedia frame 106, as well as output signals to users, are all transmitted in packetized form through packet network 10. Such a multimedia frame is described in more detail in copending patent application Ser. No. 08/056974 filed May 3, 1993 and assigned to the assignee of this invention.

Game frame 110 contains a number of units for generating compressed and packetized audio and video signals for use in computer games that may be offered as part of an interactive television service. One or more of such units is assigned to each user of a computer game.

Application processor 102 and applications resources 104, 106, 108 and 110 can be combined in various ways to form what can be thought of as application servers for providing different ITV services. For example, a video-on-demand / enhanced-pay-per-view server could include application processor 102 and data cache 104; a multimedia ITV server could include application processor 102, data cache 104, multimedia frame 106 and broadcast source 108 and a game server could include application processor 102, multimedia frame 106 and game frame 110. Each application processor 102 can be used in more than one such server, up to the limit of its capacity.

Interfaces such as cable distribution interface 112 are typically located at cable television system headends and connected to signal converters 130 situated on cable customers' premises by distribution cable 116, whereby the signal converter 130 for each cable customer receives the same overall "downstream" signals broadcast to all cable customers. However, signal converters 130 can be enabled by control packets transmitted over cable 116 to receive only certain specified "virtual" channels from cable 116.

Interfaces such as telephone distribution interface 114 are typically located at telephone central offices and connected to signal converters 140 situated on telephone subscribers' premises by subscriber loops 115, whereby each telephone subscriber receives a different downstream signal.

Signal converters 130 and 140 convert the downstream signals into conventional television signals for display on television receivers 134. Users can send "upstream" signals to control processor 100 and applications processors 102 from input means such as remote control 132 that transmit control messages to signal converters 130 or 140, as the case may be. Other devices, such as processors, printers, video cameras, telephones and other input and output devices can be connected to signal converters 130 and 140 as required for the provision of ITV services.

The various data and control packets transmitted through the packet network each contain a header and a body. The header defines a "virtual channel" in which the packet is deemed to be transmitted. In data packets, the body contains data, such as part of a digitized and compressed audio or video signal. In control packets, the body contains information such as the address of the unit for which the packet is intended and an action to be performed. In the exemplary embodiment, each packet contains four bytes in the header, two bytes for a polling address and two bytes identifying the virtual channel of which the packet is a part, and 48 bytes in the body. Thus, $2^{16}$ polling addresses and $2^{16}$ virtual channels are possible. Control packets are typically sent in one or more specifically assigned virtual channels, for example, channel "0".

For each link 140 connected to packet switch 120, packet switch control 121 stores information identifying which packets are to be transmitted over such link. Such information is based on header contents; for example, certain virtual channels and/or certain polling addresses can be identified for transmission over a link. A packet arriving at packet switch 120 over any link is then routed to one or more links 140 depending on its header contents. Packet switch control 121 can itself receive packets from packet network 10, and, in the system of the invention, control processor 100 sends control packets as needed to packet switch control 121 Containing such identifying information for each link 140.

In an exemplary embodiment, a television signal is made up of three separate data signals, one video and two audio (for stereophonic sound). Each signal is separately digitized and compressed and sent through packet network 120 as a packet stream in a separate virtual channel. Accordingly, three virtual channels are used for transmission of a single television signal. However, other embodiments are possible in which multiple audio channels are encoded and compressed together, such as the Dolby AC-2 system.

Figure 2:
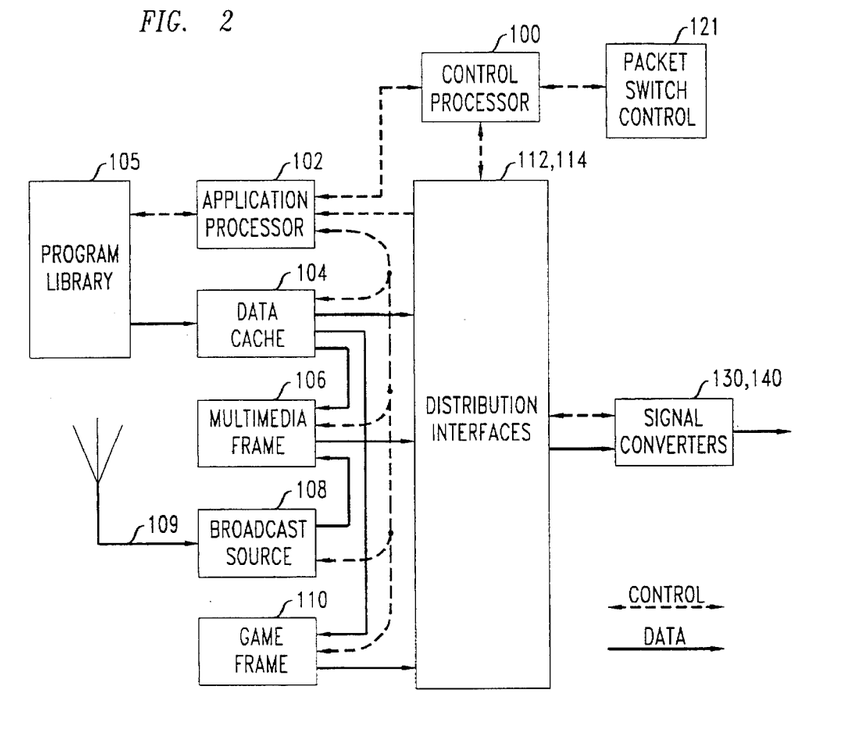
FIG. 2 is a block diagram showing the overall flow of control and data packets in the system of FIG. 1.

FIG. 2 shows typical flows of data and control packets through packet network 10 and in other parts of the system. During the furnishing of ITV services, data packets containing audio and/or video information flow from application resources such as data cache 104, multimedia frame 106 and game frame 110 to signal converters 130 and 140. Such data packets can also flow between application resources, such as from data cache 104 to multimedia frame 106 and game frame 110 and from broadcast source 108 to multimedia frame 106. During interactions with users, control packets flow between signal converters 130 and 140 and control processor 100 and/or between signal converters 130 and 140 and application processor 102. Control processor 100 interacts with application processor 102 and with packet switch control 121 by means of control packets, and application processor 102 interacts with application resources 104, 105, 106, 108 and 110 by means of control packets. Data packets from program library 105 to data cache 104 can be sent via a direct link or via a packet network; even via packet network 10, if convenient. The link between application processor 102 and program library 105 carries only control packets and can be of lower capacity than the links in packet network 10, for example, such link-can be part of an Ethernet (+m) network.

The flexibility of packet network 10 makes possible flows of data and control packets between any pair of terminals and from one terminal to groups of terminals. Possibly useful paths for control packets that are not shown are between signal converters 130 and 140 on the one hand to multimedia frame 106 and game frame 110 on the other. These paths may be desirable for use in time-dependent interactive applications using multimedia frame 106 and game frame 110 in which an extremely fast response to an action by a user is desired. As will be described, multimedia frame 106 contains processors that can generate and respond to such control packets, and game frame 110 typically will also contain such processors.

In general, control server 100 interacts with users to control requested services and to set up the necessary paths through packet network 10. During the delivery of a service by application resources 104, 106 and 110, under control of application processor 102, control processor 100 maintains supervision by responding to certain control packets from signal converters 130 and 140; application processor 102 responds to control packets from signal converters 130 and 140 specifically relating to an ITV service being delivered. However, as described above, application resources may respond directly to control packets from signal converters 130 and 140.

The system described above contains many processors, not only control processor 100 and application processor 102, which are typically relatively large processors such as Sun "SPARCSTATION" computer, but also smaller processors in the various elements of the system. The problem is how to efficiently program such processors to control the multiple processes needed to provide interactive television services to multiple users simultaneously. This problem is solved in accordance with the present,invention by Using hierarchies of finite state machines (FSMs).

Many control devices have multiple states with permitted transitions between states. Such devices can range from simple controllers containing a few relays, logic circuits or a single microprocessor to complex control systems including multiple processors. Such control devices can often be analyzed by simulating them as a series of finite state machines, also called finite automata. FSMs themselves can be implemented by computer programs. Thus, it is feasible to design and implement a control system as a series of FSMs implemented in processors.

In accordance with the invention, the presentation of each program element needed for interactive television services, such as video clips, audio clips and still frames, is a separate process controlled by a terminal FSM at the lowest level of a hierarchy of FSMS. The higher-level FSMs in the hierarchy are called director FSMs. Terminal FSMs are also used for receiving control signals from processes and input messages from users. All such FSMs can be implemented by computer programs in the various processors of the interactive television system.

Figure 3:
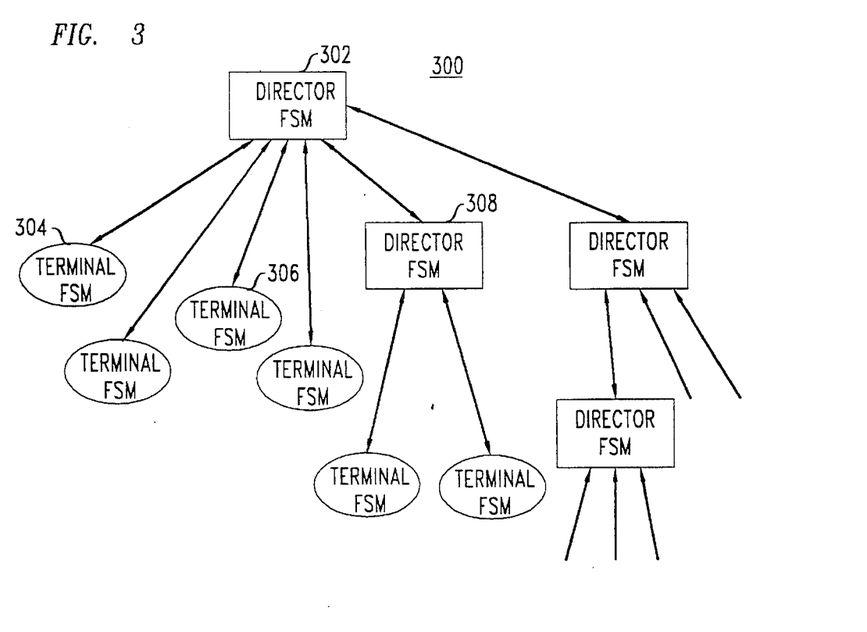
FIG. 3 is a diagram showing part of a hierarchy of finite state machines (FSMs) in accordance with the invention.

FIG. 3 is a diagram of a hierarchy 300 of FSMs configured in accordance with the invention for controlling interactive television services to a user. Such a hierarchy can be associated with each user. Each hierarchy is in the form of an inverted tree with multiple levels, with a single director FSM 302 at the top level. Director FSMs communicate with terminal FSMs, such as terminal FSMs 304 and 306, and other director FSMs, such as director FSM 308. The terminal FSMs can be thought of as leaves on the tree.

Communication among the FSMs in a hierarchy is by means of event messages. Event messages from an FSM are initiated by state transitions in the FSM, and event messages received by an FSM can cause state transitions in that FSM. In turn, a transition in an FSM can cause that FSM to send one or more event messages to other FSMs, or can cause some other action to be taken by the FSM. For FSMs implemented in the same processor, such event messages are simply passed from one part of the computer program in the processor to another part, such as through message buffers for each FSM. For FSMs implemented in different processors, such event messages can be transmitted as control messages, such as control packets via packet network 10 shown in FIG. 1. Event messages can be simple requests to change state or can include additional information needed by an FSM to control a function.

Typically, an FSM hierarchy 300 will be associated with each potential user of an interactive television system. Of course, not all such users will be active simultaneously, and the servicing needs of an inactive user will usually be no more than periodic checking for a service request. Consequently, the FSM hierarchy for an inactive user may contain only a director FSM 302. In the system of FIG. 1, such director FSM is resident in control processor 100. However, the FSM hierarchy for an active user will expand to include the necessary additional director and terminal FSMs needed to control the service being provided.

Intermediate director FSMs such as 308 that are at lower levels in the hierarchy than director FSM 302 can be resident in application processor 102. Terminal FSMs can be resident in the processor directly controlling a process, such as the processors in data cache 104 or multimedia frame 106. Terminal FSMs can also be resident in processors included in signal converters 130 and 140. Thus, an FSM hierarchy 300 can be distributed over multiple processors in a system such as that shown in FIG. 1.

FSM hierarchies can also be used to control the "housekeeping" functions of systems such as that shown in FIG. 1. The various. FSMs in such a hierarchy can be resident in processors such as control processor 100 and processors in the packet switches 120 of packet network 10 and processors in distribution interfaces 112 and 114.

Figure 4:
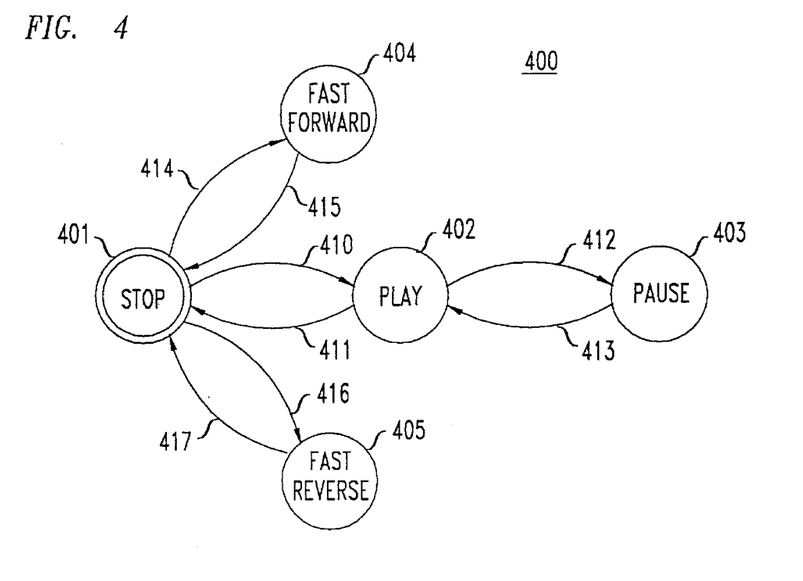
FIG. 4 is a state diagram of an FSM for controlling a video clip such as a movie.

FIG. 4 is a state diagram 400 of an FSM for controlling the showing of a video clip, such as a movie. Such an FSM could be used, for example, as a terminal FSM in data cache 104 shown in FIG. 1. States 401–405 are shown, together with permitted transitions 410–417. Other transitions could be permitted, for example, from play state 402 to fast forward state 404 and back. However, the transitions shown will be sufficient to illustrate the principles of an FSM.

Stop state 401 is shown as a double circle to indicate that such state is the initial state of the FSM. When the overall system is initialized, all FSMs are typically placed in their initial state.

FSMs can change state in response to event messages from other FSMs and certain FSMs can change state in response to input signals from a user. Terminal FSMs may be adapted to Change state in response to signals indicating the status of the process being controlled, or the process may be operated "open loop" in which control signals are sent to the process but no signals are received from the process. Assume, for example, that an FSM having state diagram 400 is used to control a video cassette player: State transitions then occur in response to input signals from controls operated by a user and status signals from the playing mechanism itself. For example, depressing the "Play" control button in stop state 401 causes transition 410 to occur and depressing the "Play" control button in pause state 403 causes transition 413 to occur. Similarly, pressing the "Stop" button in fast-forward state 404 causes transition 415 to occur. However, transition 415 can also occur when an appropriate sensor in the video cassette player transmits a status signal indicating that the end of the cassette has been reached.

State transitions can cause an FSM to send event messages, in this example the event messages are control signals to the cassette player. For example, transition 410 causes the player to start and transition 411 causes the player to stop. A terminal FSM in control of apparatus such as a cassette player sends the appropriate control signals to the apparatus on each transition. Of course, the apparatus itself may be thought of as an FSM as it responds to such signals.

An FSM having state diagram 400 would function similarly as a terminal FSM in apparatus such as data cache 104 in FIG. 1. However, instead of signals directly from manual controls, such a terminal FSM would receive event messages from, and send event messages to, a director FSM, and send and receive event messages to control the appropriate reading out of data from the random-access memory in data cache 104. Such director FSM could be in another processor, such as application processor 102. In such a director FSM, received event messages cause state transitions; such state transitions in turn cause other event messages to be sent.

Director FSMs serve to coordinate related processes at a particular level in an FSM hierarchy 300. In general, the closer a director FSM is to top-level director FSM 302 in the hierarchy, the more abstract its function. In an interactive television system, director FSM 302 will typically control the initial interaction of a user with the system, that is, the initial "logon" of a user and the selection of service.

Use of an FSM hierarchy 300 in controlling an interactive television system in accordance with the invention will now be described more specifically. As an example, the operation of director FSM 302 and its associated FSMs in such hierarchy in presenting a multimedia menu screen to and interacting with a user requesting service will be explained.

Figure 5:
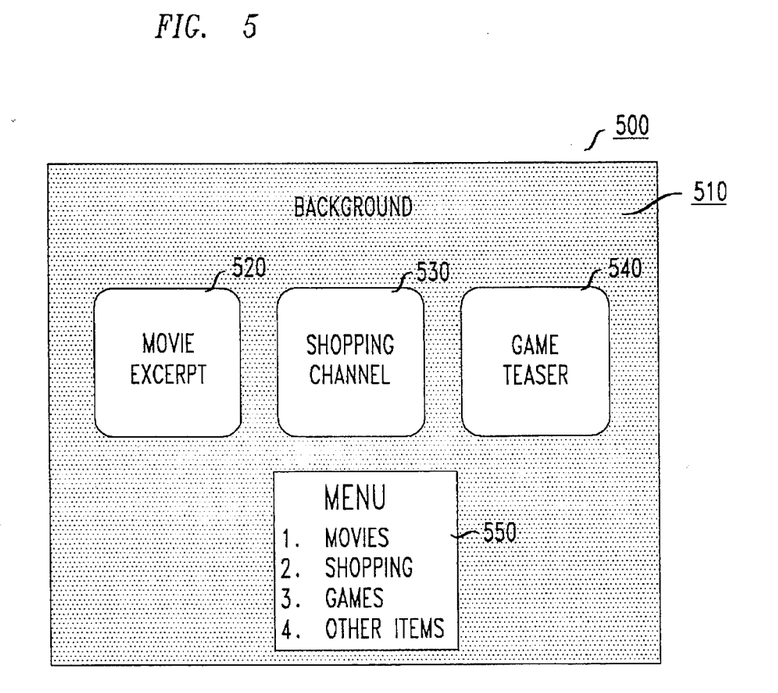
FIG. 5 is a diagram of a menu screen for display by an interactive television system.

Referring to FIG. 5, menu screen 500 consists of three scaled-down full-motion video images 520, 530 and 540 displayed in window overlays on a still-frame background 510 and with superimposed text 550. Display of such a screen is typically accompanied by appropriate background audio, such as a stereophonic musical selection, and may also include an introductory voice message, such as a greeting with brief instructions on how to proceed with selection of a service.

To generate menu screen 500, a composing unit in multimedia frame 106 is assigned and virtual channels in packet network 10 are also assigned for routing the appropriate audio and video signals for the elements in the menu screen, in digitized and compressed form, to the assigned composing unit. The full-motion video packets for the movie excerpt to be shown in window 520, the game teaser to be shown in window 540 and the audio packets for the background music and introductory voice message are stored in data cache 504. The video signal for the shopping channel to be shown in window 530 is supplied by broadcast source 108. The video packets for background 510 are transmitted initially to a frame buffer in the composing unit in multimedia frame 106. The text is also generated in the composing unit. Virtual channels are also assigned as appropriate for routing the output of the composing unit to the user.

Figure 6:
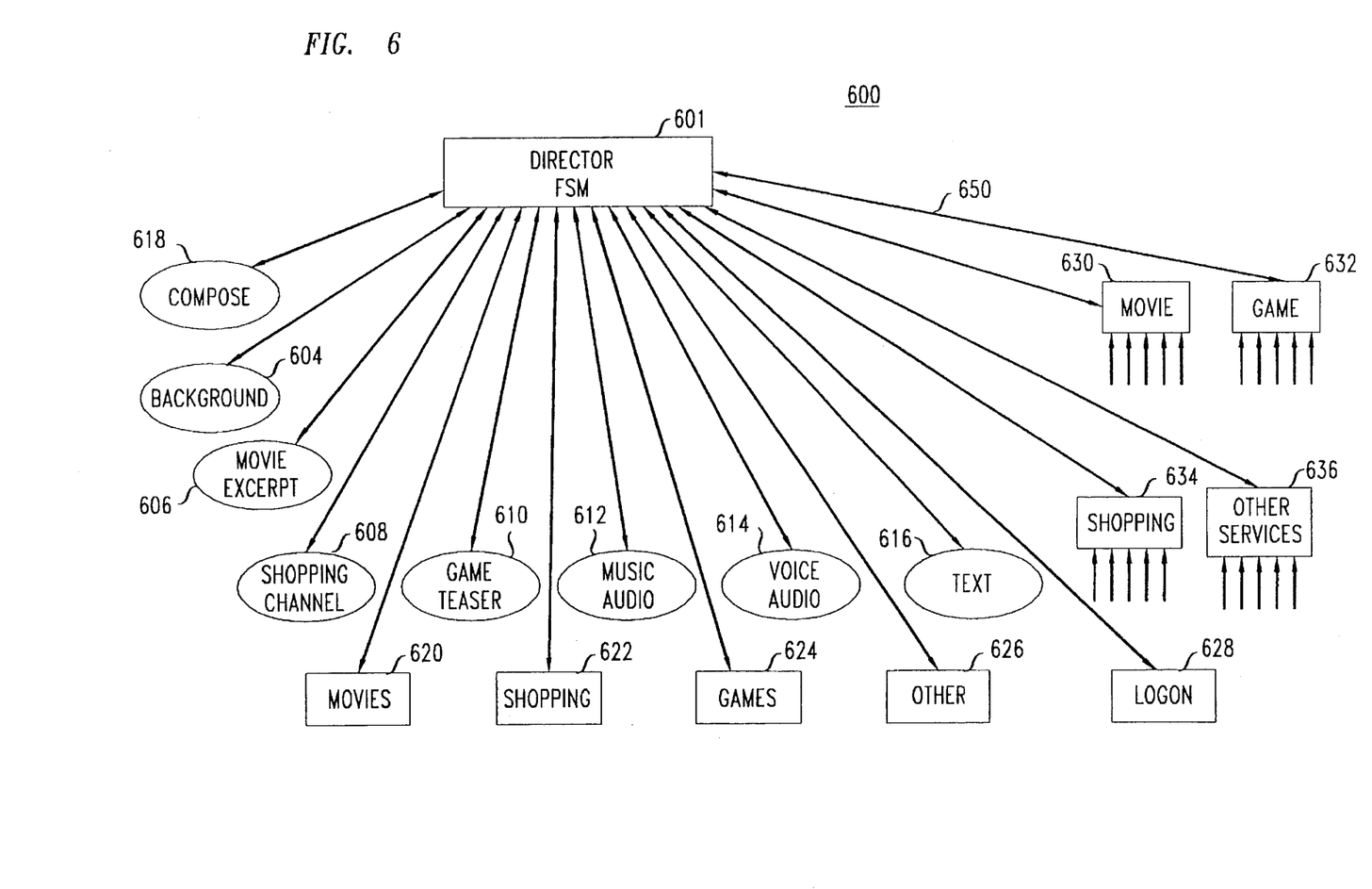
FIG. 6 is a diagram showing part of a hierarchy of FSMs for controlling an interactive television system.

FIG. 6 is a diagram showing pan of a hierarchy of FSMs for implementing the menu screen example on an interactive television system. Shown are top-level director FSM 601, terminal FSMs 604–628, and other director FSMs 630–636. Other pans of the hierarchy, not shown, extend from director FSMs 630, 632, 634 and 636.

Director FSM 601 is configured to present multimedia menu screen 500 to a user and to control the selection of a particular kind of ITV service by the user. Accordingly, such FSM activates terminal FSMs 604–616 to generate the various elements needed for the menu screen, activates and responds to terminal FSMs 620 which receive input messages from the user and activates director FSMs 630–636 based on the input message received. Arrows such as 650 indicate permitted communication paths between FSMs. Again, the various FSMs can be resident in various processors in a system such as that shown in FIG. 1.

Figure 7:
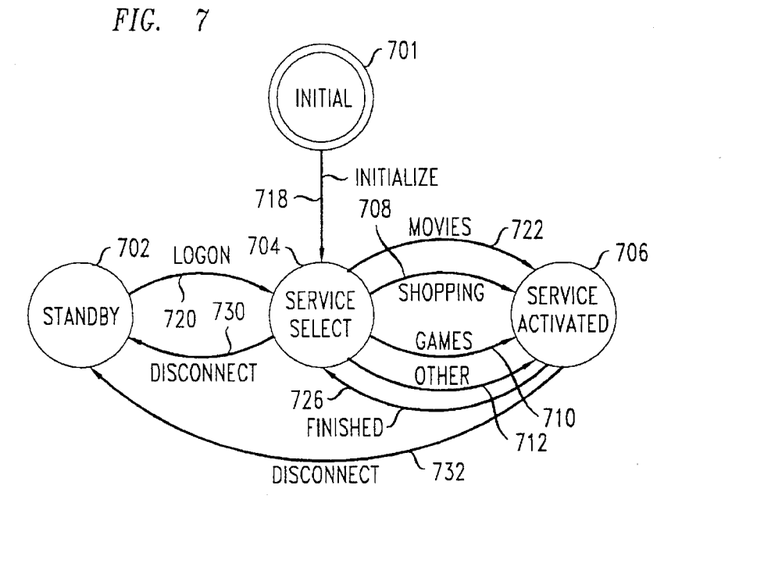
FIG. 7 is a partial state diagram for the director FSM in the hierarchy of FIG. 6.

FIG. 7 shows state diagram 700 for director FSM 601 in the hierarchy of FIG. 6. A number of states 701–706 are shown, together with various permitted transitions between states. Such an FSM would undoubtedly include other possible states, but those shown will suffice for explanatory purposes.

As mentioned above, a director FSM 601 is typically provided in the system, such as in control processor 100, for each potential user of the system. When the system is first started, all FSMs 601 will be in their "Initial" states 701. An "Initialize" event message, which can be responded to by multiple FSMs that have initialization routines, causes transition 718 from "Initial" state 701 to "Standby" state 702. Each transition is associated with an action list of event messages to be sent when such transition occurs. Such action list for transition 718 can include an event message to logon input FSM 628, placing such FSM into an alerted state to be responsive to logon attempts. Since each FSM has a unique identity for receipt of event messages, Such action list can also include an event message to signal converter 130 or 140 for the associated user which includes such identity.

When a successful logon occurs, FSM 628 returns to its "Initial" state and sends an event message to FSM 601 causing "Logon" transition 720 to occur between state 702 and state 704 in FSM 601. The action list associated with transition 720 includes event messages to terminal FSMs 604–618 as necessary to initiate the generation of multimedia menu screen 500, and event messages to input FSMs 620–628 to activate such FSMs to receive user inputs. Information in such event messages can be based on a user profile stored in the processor, for example control processor 100, where FSM 601 is resident. In fact, the configuration of director FSM 601 and its communicant FSMs can also be based on such a profile.

Each event message from FSM 601 causes appropriate state transitions in the destination FSMs and initiates the process controlled by that FSM. For example, to display background 510 in menu screen 500, the event message sent by FSM 601 to FSM 604 can include an identification of the background to be used and the virtual channel over which the compressed data for such background is to be sent. FSM 604 is typically resident in data cache 104, where the data for such background is stored. The event messages to FSMs 606–616 are similar in that such messages can include an identification of the data to be provided and an identification of a virtual channel to be used.

The event message to FSM 618 contains the appropriate information to set up the composing unit in multimedia frame 106, where FSM 618 typically resides. Such information includes the virtual channels over which the audio and video elements will be received, the size and position of each video element on menu screen 500, such as the sizes and positions of windows 520, 530 and 540, the necessary information to combine the music audio and voice audio controlled by FSMs 612 and 614, and information identifying the user to which the resulting multimedia signal (typically in the form of packets in virtual channels) is to be sent. The event message to FSM 616, which also typically resides in the composing unit, can indicate the form of text 550 to be displayed and its position on the menu screen. Thus, while FSM 601 is in "Service Select" state 704, menu screen 500 appears on the user's television set, and FSM 601 awaits a selection by the user.

The user inputs to which input FSMs 620–626 respond can be entered with any appropriate means, such as remote control 132 or a computer mouse positioning and "clicking" a cursor at an icon or label on menu screen 500. When a user enters a request, an event message directed to the appropriate one of FSMs 620–626 is sent from signal converter 116 to control processor 100, where such FSMs reside. For example, if the user requests "Movies," FSM 620 returns to its initial state and, in so doing, sends an event message to director FSM 601 that causes transition 722 from "Service Select" state 704 to "Service Activated" state 706.

Transition 722 itself causes event messages to be sent to other FSMs, including an event message to director FSM 630 causing a transition in that FSM from its initial state to an active state. Director FSM 630 controls the actual selection and showing of a movie, possibly from a long list of available titles, and possibly by giving the user the opportunity to view a trailer or preview of a movie before actual selection. This is accomplished by applying the same techniques described above arranged to perform such tasks, and will not be described in detail here. However, for explanatory purposes, assume that all the video activities involved in movie selection will continue to be superimposed on the same background 510 as used in menu screen 500 and that the same music audio will be continued during movie selection. Accordingly, transition 722 in FSM 601 can send event messages to return FSMs 606, 608, 610, 614 and 616 to their initial states and an event message to FSM 618 to reconfirm the composing unit in multimedia frame 106 for the movie selection process. No event messages are sent to FSM 604 or 614, so the background and music audio continue without interruption. Thus, director FSM 601 keeps FSMs 604, 612 and 618 active during entry into state 706. At this point, director FSM 630 is active and director FSM 601 is in a quiescent state.

During the movie selection process, various terminal and director FSMs (not shown) are activated by director FSM 630 as necessary. When a movie is selected, director FSM 630 sends an event message to a terminal FSM (not shown), typically resident in data cache 104, causing such terminal FSM to show the movie, and event messages to return FSMs 604, 618 and 612 to their initial states. The actual showing of the movie is then under the control of director FSM 630 and its terminal FSM in data cache 104.

When the movie is finished, the controlling terminal FSM in data cache 104 and director FSM 630 return to their initial states and an event message from FSM 630 to director FSM 601 results in transition 726. Transition 726 has essentially the same action list of event messages as transition 720, thus again displaying menu screen 500 for the user, who can then repeat the selection process.

Similarly, the services controlled by director FSMs 632, 634 and 636 can be invoked by transitions 710, 708 and 712, respectively, in director FSM 601. As can be seen from the above description, the various selection processes, multimedia signal composition processes and control processes can be implemented by appropriate extensions to the hierarchy of director FSMs and terminal FSMs. As mentioned above, the FSMs themselves can be resident in any of the various processors in the overall system, wherever they are situated.

Disconnect transitions 730 and 732 all return FSM 601 to standby state 702. Such transitions result from receipt of an event message from signal converter 130 or 140 that the user has disconnected. The action lists for such transitions include the event messages needed to place all active lower-level FSMs back in their initial states.

To reiterate, each transition in an FSM from one state to another state is associated with an action list of event messages to be sent by the FSM, and each transition is associate with receipt by the FSM of an event message of one or more specified types. Actions may also be activities other than sending event messages, such as controlling physical devices. The same type of event message can cause a transition from different states of an FSM, for example, an event message arriving at FSM 601 indicating "Disconnect" causes a transition from any current state in the FSM to the "Standby" state.

Figure 8:
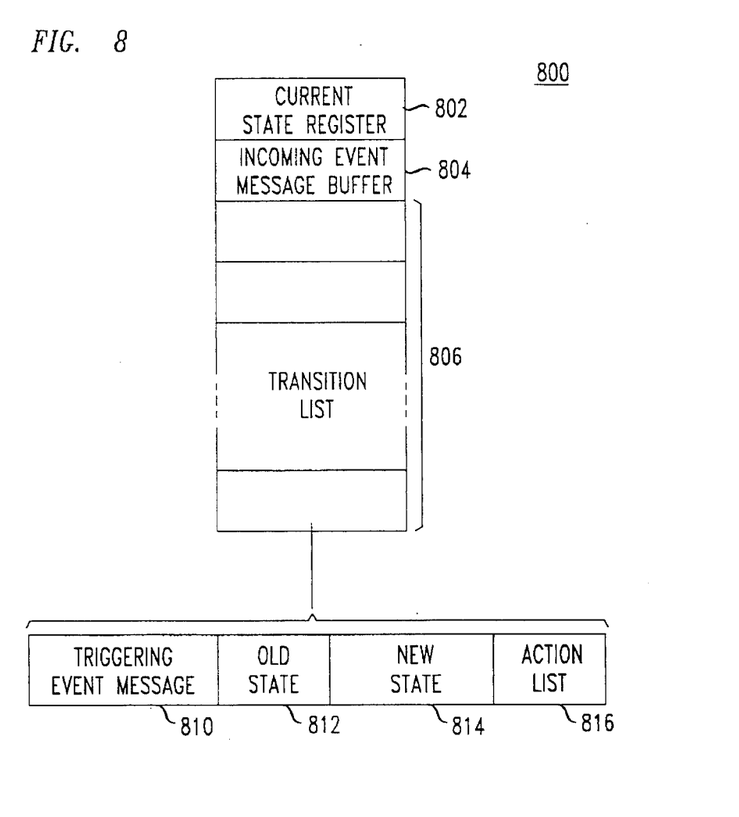
FIG. 8 is a diagram showing a data structure for an FSM.

An FSM hierarchy such as hierarchy 600 in FIG. 6 can be represented in the various processors involved as a data structure that includes the various registers, buffers, and lists needed to define the FSMs. Such a data structure can then be followed for each user as needed to set up the FSMs necessary for controlling the services requested by the user. FIG. 8 is a diagram showing a possible organization for such a data structure. Data structure 800 includes state register 802 for storing the current state of the FSM, buffer 804 for temporarily storing incoming event messages and transition list 806 specifying the incoming event messages that will trigger state transitions and the actions to be taken upon occurrence of each transition. Each entry in list 806 includes at least an identification of a triggering event message (field 810), the old state from which such event message will cause a transition (field 812), the new state after such transition (field 814) and an action list (field 816). The action list specifies actions to be executed upon occurrence of the transition, such as event messages to be sent, control messages to be sent (in the case of a terminal FSM controlling a process) and other actions, such as data manipulation. As an alternative to storing action lists in transition list 806, field 816 can contain a pointer to an action list stored elsewhere. Many other possible data structures for FSMs will be apparent to those skilled in the art.

Figure 9:
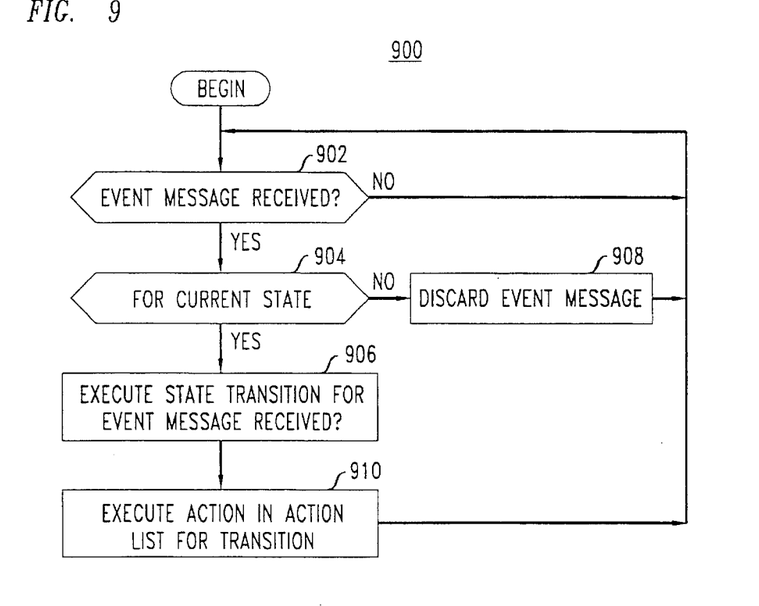
FIG. 9 is a high-level flow chart of a computer program for implementing an FSM.

FIG. 9 is a high-level flow chart 900 of a computer program for implementing an FSM. Such program is executed, for example, on receipt of an event message for the FSM (step 902). If the received event message relates to the current state of the FSM (step 904), the state transition associated with the event message is executed (step 906) and the actions on the action list for such state transition are carried out. If the received event message does not relate to the current state, such event message is discarded (step 908). Referring to the data structure shown in FIG. 8, step 904 can be accomplished by searching transition list 806 for an entry having both the incoming event message in field 810 and the current state in field 812. If such an entry is found, step 906 can be accomplished by replacing the contents of state register 802 with the contents of field 814 in such entry and step 910 can be accomplished by executing the actions listed in field 816. If such an entry is not found in list 806, then the event message is discarded (step 908).

As described above, a tree structure is preferred for FSM hierarchies in accordance with the invention for ease of understanding, organization and consistency. One reason for preferring a tree structure is its modularity; that is, the portion of a tree based on any of the director FSMs can be considered a self-contained module whose operation is predictable. Such modules, once defined, can be reused in other hierarchies when the same function is needed. However, linkages can be set up in the hierarchy that jump from branch to branch or level to level in the tree, if desired, but such linkages may destroy such modularity and make the operation of the FSM hierarchy less understandable.

Figure 10:
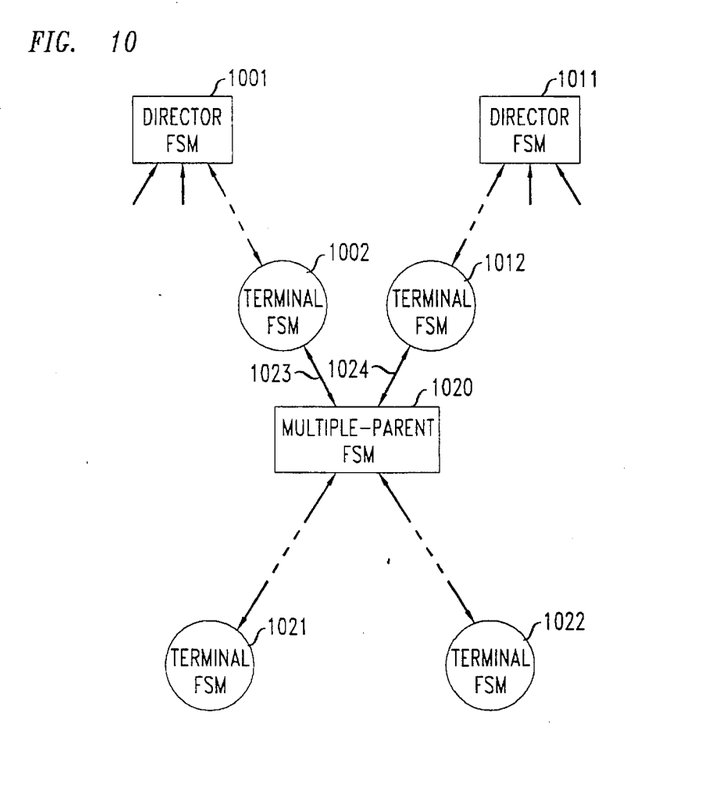
FIG. 10 is a diagram showing how hierarchies of FSMs can be linked.

In some applications, it may be convenient to link hierarchies. For example, it may be desirable to permit multiple users of an interactive television system to interact, such as in playing a game. FIG. 10 is a diagram showing how hierarchies for two users can be linked to a third hierarchy.

Referring to FIG. 10, a first FSM hierarchy for the first user is represented by director FSM 1001 and terminal FSM 1002 and a second hierarchy for the second user is represented by director FSM 1011 and terminal FSM 1012. The third hierarchy, which may, for example, control a two-participant game, is represented by multiple-parent FSM 1020 and terminal FSMs 1021 and 1022. Of course, each hierarchy will undoubtedly include more director and terminal FSMs, but these are omitted for clarity. Multiple-parent FSM 1020 is adapted to communicate by event messages with one or more terminal FSMs in other hierarchies, via links 1023 and 1024 to terminal FSMs 1002 and 1012 in this example. Links 1023 and 1024 serve as clearly defined interfaces between the hierarchies. The hierarchy including FSMs 1020, 1021 and 1022 is arranged to coordinate the activities of its multiple users, such as the players of a two-participant game. It will be clear that a multiple-parent FSM can be arranged to have any practical number of parents. It will also be clear that an FSM hierarchy can have links to a plurality of other hierarchies.

Various aids can be provided to an author or programmer of a control system using FSM hierarchies in accordance with the invention for use in such applications as providing ITV services. Such aids can include various software tools to enable an author to broadly define the various ITV services to be provided and also to program the details of a service, such as specifying the composition of a multimedia signal such as menu screen 500, and the like. Such software tools can include high-level languages and compilers that can be used to generate the various FSM data structures needed. Also useful are authoring systems that simulate for an author the actual responses of a system being designed.

The invention has been shown and described with reference to particular embodiments, more particularly, embodiments relating to interactive television systems. However, it will be understood by those skilled in the art that various changes may be made therein without departing from the spirit and scope of the invention, and that the invention can be adapted for use in other applications wherein multiple processes are controlled and coordinated.

What is claimed is:

1. A method of controlling processes in an interactive system in response to input messages from users of said interactive system wherein a hierarchy of finite state machines (FSMs) is associated with each user, each FSM having multiple states and multiple permitted state transitions, each hierarchy having one or more first terminal FSMs for responding to said input messages from said user, one or more second terminal FSMs for providing control signals to said processes, and one or more director FSMs, said first terminal FSMs and said second terminal FSMs each being associated with a single director FSM at the next higher level in said hierarchy, each director FSM being associated with one or more first terminal FSMs, second terminal FSMs and/or director FSMs at the next lower level in said hierarchy and no more than one director FSM at the next higher level in said hierarchy, which comprises the steps of:

in each hierarchy:

causing selected state transitions to occur in said first terminal FSMs in response to selected input messages from the particular user associated with said hierarchy;

generating selected event messages for the director FSM associated with each first terminal FSM in response to selected state transitions in said first terminal FSM;

generating selected event messages for the first terminal FSMs, second terminal FSMs and/or other director FSMs associated with a particular director FSM in response to selected state transitions in said particular director FSM;

causing selected state transitions to occur in said first terminal FSMs, said second terminal FSMs and said director FSMs in response to selected event messages therefor; and generating selected control signals for each process being used by said particular user in response to the occurrence of selected state transitions in said second terminal FSMs associated with said process;

the particular operation of said processes in response to said input messages being determined by the arrangement in said hierarchy of said first terminal FSMs, said second terminal FSMs and said director FSMs, the particular states and state transitions permitted for said first terminal FSMs, said second terminal FSMs and said director FSMs, the particular input messages and/or event messages causing each permitted state transition to occur and the particular event messages and/or control signals generated in response to the occurrence of each permitted state transition.

2. The method of claim 1 in which said first terminal FSMs, said second terminal FSMs and said director FSMs in each hierarchy are implemented in one or more processors by one or more computer programs.

3. The method of claim 2 in which each first terminal FSM, second terminal FSM and director FSM in each hierarchy is implemented in one of said processors and said processors are situated at one or more locations.

4. The method of claim 1 wherein at least one of said processes generates at least one status signal for at least one of said second terminal FSMs associated with said at least one process, which further comprises the steps of:

causing at least one of said state transitions in said at least one second terminal FSM to occur in response to said at least one status signal;

generating selected event messages for the director FSM associated with said at least one second terminal FSM in response to selected state transitions in said at least one second terminal FSM;

whereby the operation of said at least one process in response to said input messages is also determined by the particular status signals causing said state transitions to occur in said at least one second terminal FSM.

5. The method of claim 1 wherein at least one first terminal FSM, second terminal FSM or director FSM in each of at least two of said hierarchies generates at least one event message for a first terminal FSM, second terminal FSM or director FSM in another one of said at least two hierarchies, thereby permitting interaction among the users associated with each of said at least two hierarchies.

6. The method of claim 1 wherein said interactive system is an interactive television system and said processes are television program sources.

7. Apparatus for controlling processes in an interactive system in response to input messages from users of said interactive system, which comprises:

a hierarchy of finite state machines (FSMs) for each user, each FSM having multiple permitted states and multiple permitted state transitions, each hierarchy having one or more first terminal FSMs for responding to said input messages from said user, one or more second terminal FSMs for providing control signals to said processes and one or more director FSMs, said first terminal FSMs and said second terminal FSMs each being associated with a single director FSM at the next higher level in said hierarchy, each director FSM being associated with one or more first terminal FSMs, second terminal FSMs and/or director FSMs at the next lower level in said hierarchy and no more than one director FSM at the next higher level in said hierarchy;

means for causing selected state transitions to occur in said first terminal FSMs in each hierarchy in response to input messages from the user associated with said hierarchy;

means for generating selected event messages for the director FSM associated with each first terminal FSM in response to selected state transitions in said first terminal FSM;

means for generating selected event messages for the first terminal FSMs, second terminal FSMs and/or other director FSMs associated with a particular director FSM in response to selected state transitions in said particular director FSM;

means for causing selected state transitions to occur in said first terminal FSMs, said second terminal FSMs and/or said director FSMs in response to said event messages therefor; and means for generating selected control signals for the processes being used by the user associated with each hierarchy in response to the occurrence of selected state transitions in said second terminal FSMs in said hierarchy;

the particular operation of said processes in response to said input messages for a given user being determined by the arrangement of the first terminal FSMs, second terminal FSMs and director FSMs in the hierarchy associated with said given user, the particular states and state transitions permitted for said first terminal FSMs, said second terminal FSMs and said director FSMs, the particular input messages and/or event messages causing each permitted state transition to occur and the particular event messages and/or control signals generated in response to the occurrence of each permitted state transition.

8. The apparatus of claim 7 wherein at least one of said processes generates at least one status signal for at least one of said second terminal FSMs in the hierarchy controlling said at least one process, which further comprises:

means for causing at least one of said state transitions in said at least one second terminal FSM to occur in response to said at least one status signal;

means for generating selected event messages for the director FSM associated with said at least one second terminal FSM in response to selected state transitions in said at least one second terminal FSM;

whereby the operation of said at least one process in response to said input messages is also determined by the particular status signals causing said state transitions to occur in said at least one second terminal FSM.

9. The apparatus of claim 7 wherein said interactive system is an interactive television system and said processes are television program sources.

* * * * *